(12) United States Patent
Crouch

(10) Patent No.: US 10,436,171 B2
(45) Date of Patent: Oct. 8, 2019

(54) PRESSURE COLLECTION AND DELIVERY PROCESS

(71) Applicant: Ernie N Crouch, Hurricane, WV (US)

(72) Inventor: Ernie N Crouch, Hurricane, WV (US)

(*) Notice: Subject to any disclaimer, the term of this patent is extended or adjusted under 35 U.S.C. 154(b) by 0 days.

(21) Appl. No.: 15/981,933

(22) Filed: May 17, 2018

(65) Prior Publication Data

US 2018/0335010 A1    Nov. 22, 2018

Related U.S. Application Data

(60) Provisional application No. 62/507,955, filed on May 18, 2017.

(51) Int. Cl.
*F03B 13/06* (2006.01)
*F03B 17/02* (2006.01)

(52) U.S. Cl.
CPC ............ *F03B 13/06* (2013.01); *F03B 17/025* (2013.01)

(58) Field of Classification Search
CPC ............................... F03B 13/06; F03B 17/025
USPC ................... 60/495–507; 290/42, 53
See application file for complete search history.

(56) References Cited

U.S. PATENT DOCUMENTS 3,515,889 A * 6/1970 Kammerer ............ F03B 13/187
  290/53
3,961,479 A * 6/1976 Anderson ............. F03B 17/025
  60/496
4,425,510 A * 1/1984 Jury ....................... F03B 13/262
  290/42
2006/0202483 A1 * 9/2006 Gonzalez ............ F03B 13/1845
  290/53
2007/0068153 A1   3/2007 Gerber
2007/0080539 A1   4/2007 Kelly
2011/0163547 A1   7/2011 Frishberg
2015/0082785 A1   3/2015 Rohrer

FOREIGN PATENT DOCUMENTS

EP    1766229 B1    11/2009

OTHER PUBLICATIONS

International Search Report and Written Opinion dated 12 Sep. 12, 2018, pertaining to PCT/US2018/033364.

* cited by examiner

*Primary Examiner* — Hoang M Nguyen
(74) *Attorney, Agent, or Firm* — Dinsmore & Shohl LLP; Monika L'Orsa Jaensson, Esq.

(57) ABSTRACT

The disclosed technology provides for an apparatus for translating energy through the use of mechanics, fluid displacement, gravity and buoyancy. The apparatus generally includes a base having float chambers and plunger chambers in fluid communication, a plurality of floats and plungers, and an energy transform assembly. The energy transform assembly includes a plurality of linkage mechanisms supported by the upper support structure and a plurality of linkage mechanisms supported by the lower support structure. Each linkage mechanism includes a pair of levers and an elongated transfer bar, with each lever rotatably affixed to an opposing end of the transfer bar in a manner to translate rotation of one lever with lateral movement of the transfer bar and lateral movement of the transfer bar causes rotation of the other lever.

20 Claims, 19 Drawing Sheets

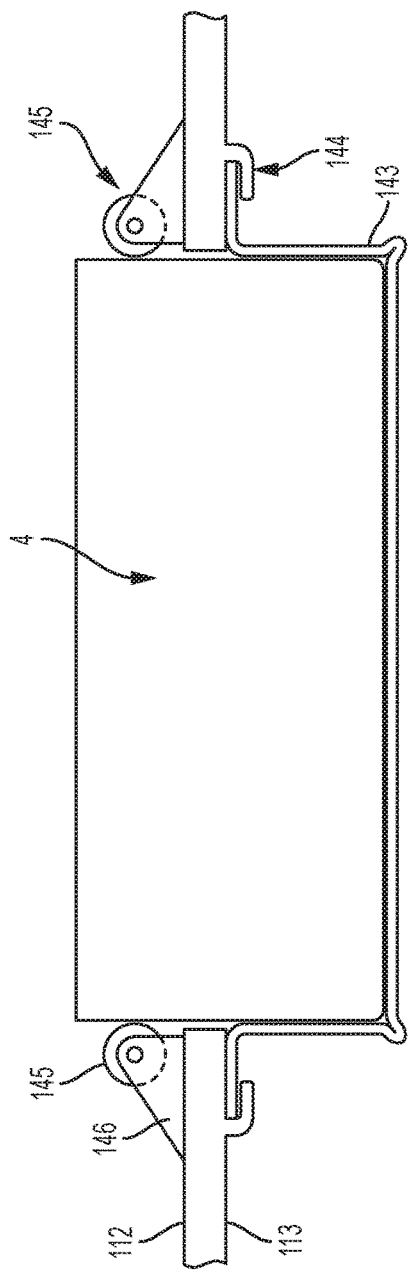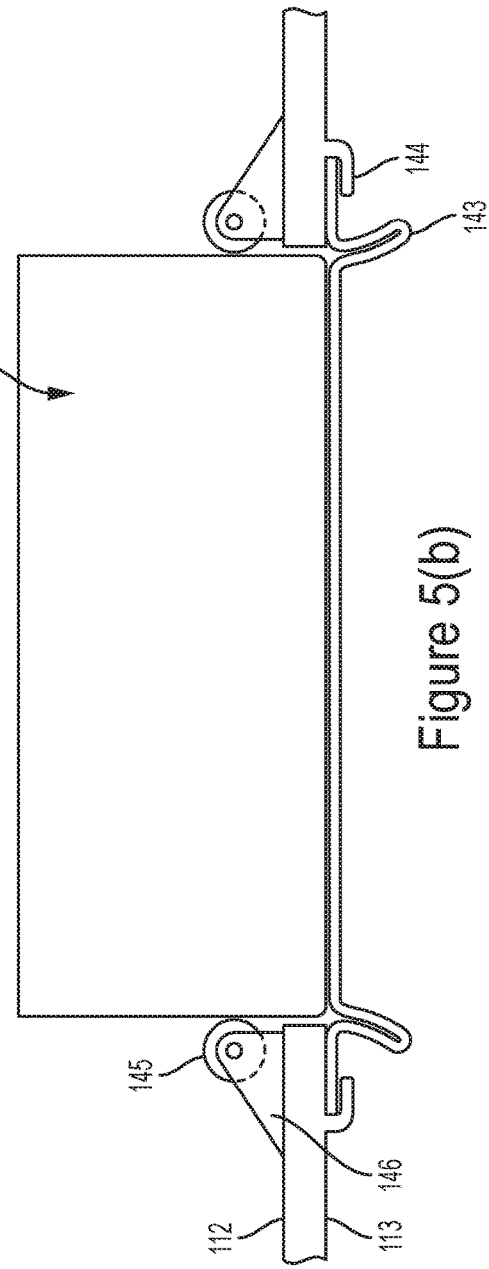

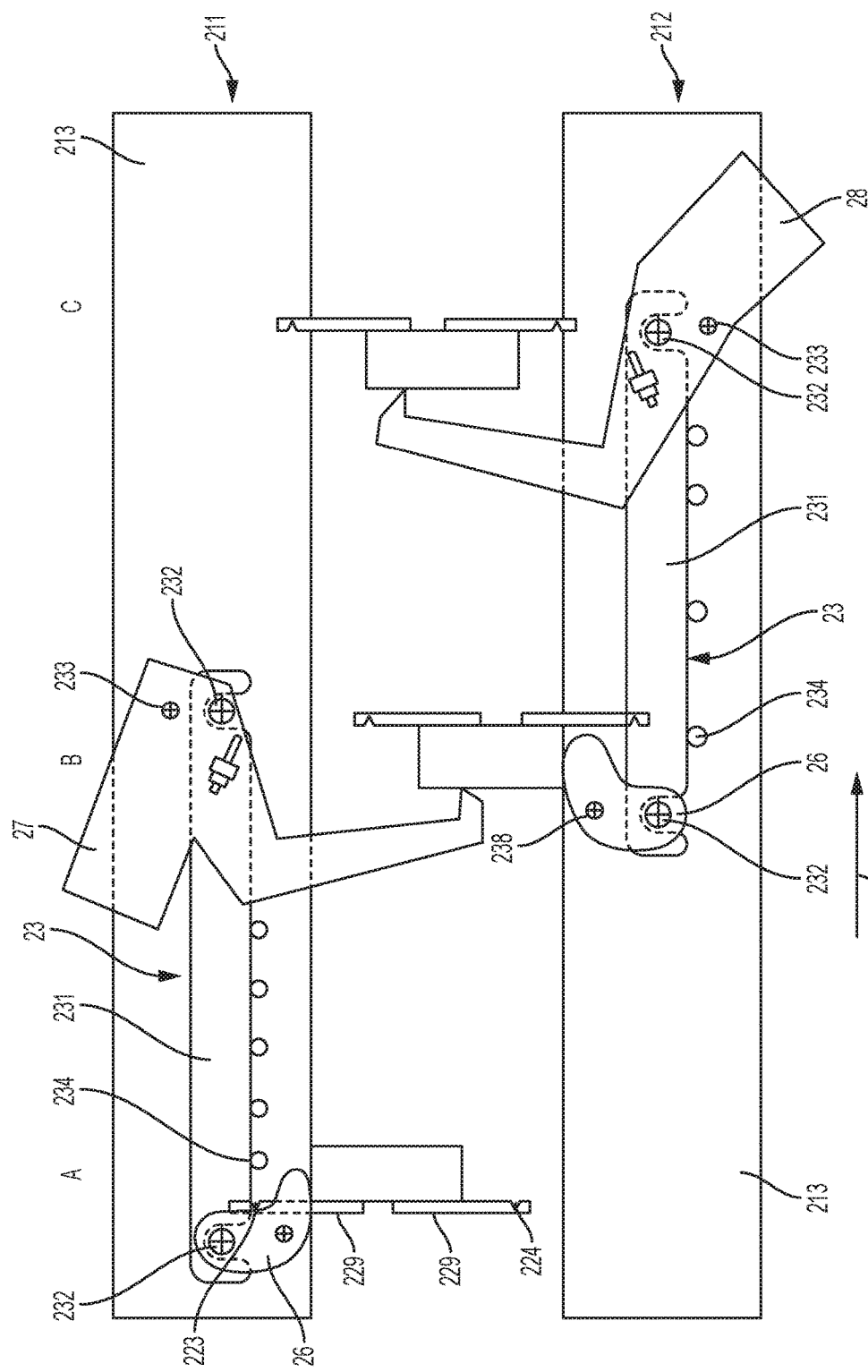

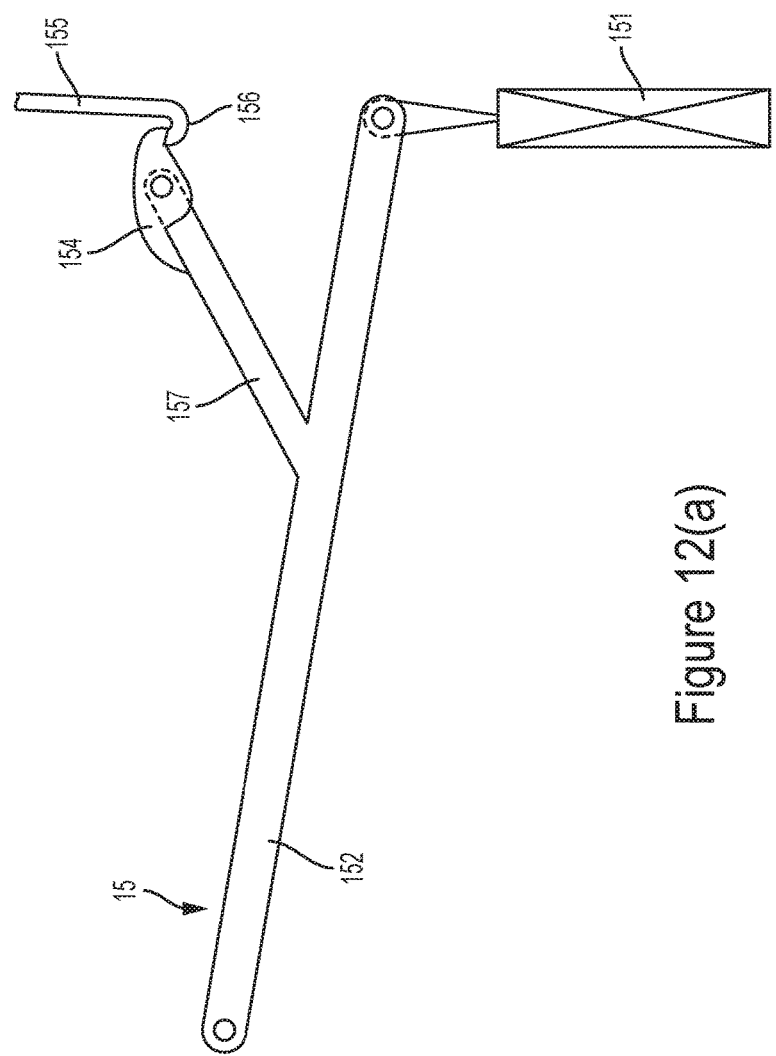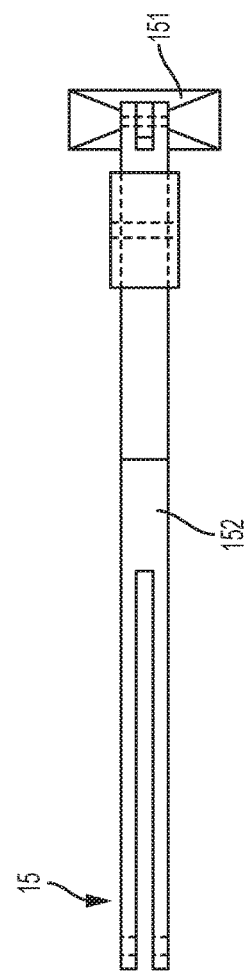
Figure 12(a)
Figure 12(b)

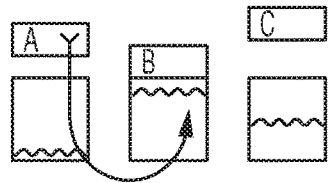
BRIDGE A DOWN → FILLS TOWER B → RELEASES FLOAT B UP AND LOCKS BRIDGE A DOWN

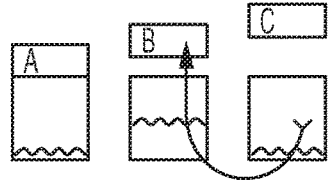
FLOAT B UP → RAISES BRIDGE B AND EMPTIES TOWER C → RELEASES BRIDGE C DOWN AND LOCK BRIDGE B UP

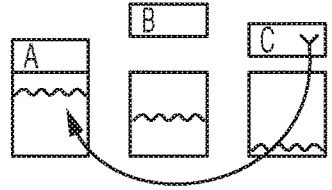
BRIDGE C DOWN → FILLS TOWER A → RELEASES FLOAT A UP AND LOCKS BRIDGE C DOWN

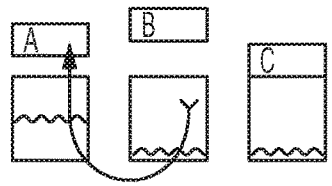
FLOAT A UP → RAISES BRIDGE A AND EMPTIES TOWER B → RELEASES BRIDGE B DOWN AND LOCKS BRIDGE A UP

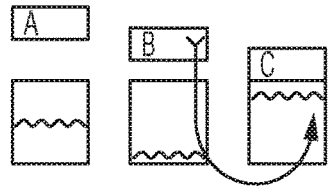
BRIDGE B DOWN → FILLS TOWER C → RELEASES FLOAT C UP AND LOCKS BRIDGE B DOWN

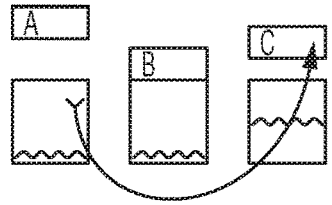
FLOAT C UP → RAISES BRIDGE C AND EMPTIES TOWER A → RELEASES BRIDGE A DOWN AND LOCKS BRIDGE C UP

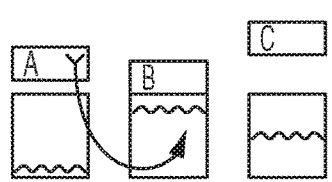
BRIDGE A DOWN → FILLS TOWER B → RELEASES FLOAT B UP AND LOCKS BRIDGE A DOWN

Figure 15

PRESSURE COLLECTION AND DELIVERY PROCESS

BACKGROUND OF THE DISCLOSED TECHNOLOGY

The disclosed technology relates to an apparatus and method for translating energy through the use of mechanics, fluid displacement, gravity and buoyancy.

The methods of the disclosed technology use buoyancy force as a power mover for a mechanical apparatus, delivering a repeating sequence of periodic upward thrusts.

GENERAL DESCRIPTION OF THE DISCLOSED TECHNOLOGY

The disclosed technology provides for an apparatus for translating energy through the use of mechanics, fluid displacement, gravity and buoyancy. The apparatus generally includes a base having float chambers and plunger chambers in fluid communication, a plurality of floats and plungers, and an energy transform assembly.

The base of the disclosed technology has a housing with a top wall extending over portions of the base, a plurality of float chambers formed within and extending from the base, and a plurality of plunger chambers formed within the housing. The float chambers are defined by sides and ends for purposes of description herein, and importantly each of the float chambers and the plunger chambers are in fluid communication by means of a plurality of channels formed within the housing. Each of the plunger chambers include a vacuous plunger chamber area under the top wall of the housing and a plunger chamber opening through the top wall of the housing, with a flexible gasket secured about the plunger chamber opening to maintain a watertight seal between the plunger chamber and the plunger chamber opening.

The float chambers are aligned in a first direction, and two plunger chambers are aligned with, and on opposing sides of, each float chamber in a second direction perpendicular to the first direction. Each of the float chambers is in fluid communication with two of the plunger chambers that are not aligned in the second direction with the float chamber. The base further includes a plurality of valve assemblies, each valve assembly being positioned within the base to control delivery of fluid from one of the float chambers to one of the plunger chambers.

The floats of the disclosed technology are made of a buoyant material, and sized and shaped to be received and traverse vertically within the float chambers, and the plungers are sized and configured to be received within the plunger chamber openings of the plunger chambers.

The energy transform assembly is coupled with the base, and includes a frame supporting an upper support structure and a lower support structure. Each of the upper and lower support structures positioned on both sides of the float chambers, and extend in the first direction. The energy transform assembly further includes a plurality of bridges, each bridge being positioned along its length in the second direction, over a pair of the plunger chambers aligned with one of the float chambers, and further being movable between the upper support structure and the lower support structure.

The bridges are respectively positioned to receive contact from one of the floats, as the float traverses upward in the float chamber, the upward traversion of the float causes vertical upward movement of the bridge. Further, the bridges include a toothed center rod designed and configured to couple with a directional bearing to translate vertical upward movement of the bridge to rotational movement of the bearing, and an associated axle extending through the bearings.

The plungers are coupled with the bridge by means of a plunger post, wherein the plunger post is positioned on the bridge so that the plungers are vertically aligned with the plunger chamber openings.

Finally, the energy transform assembly includes a plurality of linkage mechanisms supported by the upper support structure and a plurality of linkage mechanisms supported by the lower support structure. Each linkage mechanism includes a pair of levers and an elongated transfer bar, with each lever rotatably affixed to an opposing end of the transfer bar in a manner to translate rotation of one lever with lateral movement of the transfer bar and lateral movement of the transfer bar causes rotation of the other lever. The levers are positioned on the respective support structure so that contact with the bridge causes rotation of the levers. Further, certain levers are designed to engage with structure of the bridges to lock the respective bridges up or down, relative to the assembly.

In operation, as a bridge is unlocked and forced upward by the buoyancy of a float, the bridge translates energy to a directional bearing, and opens fluid communication between the float chamber and certain plunger chambers, allowing the chambers to achieve an equilibrium. As a bridge is released from an up position relative to the energy transform assembly, it falls to the lower support structure with the plungers, wherein the plungers move into the plunger openings and push water from the plunger chamber to a float chamber. The linkage mechanisms, through their operation, lock and unlock the bridges from their positions.

The process and apparatus of the disclosed technology operates generally to cause a plunger to push fluid into a float chamber, and release a float. The upward thrust of the float raises a bridge and commences the sequence of repeating periodic motion. The upper and lower linkage mechanisms reset due to gravitational force, and transfer power to continue movement throughout the system. Energy transferred from the system may be multiplied by joining multiple apparatuses as herein described.

FIGURES

Exemplary embodiments of the disclosed technology will become more fully understood from the detailed description provided below and the accompanying drawings, wherein like elements are represented by like reference numerals, which are given by way of illustration only and thus are not limiting and wherein:

FIG. 5(a) shows an embodiment of a plunger engaged in a depressed position relative to the plunger chamber, and FIG. 5(b) shows an embodiment of a plunger engaged in a raised position relative to the plunger chamber;

Figure 6B:
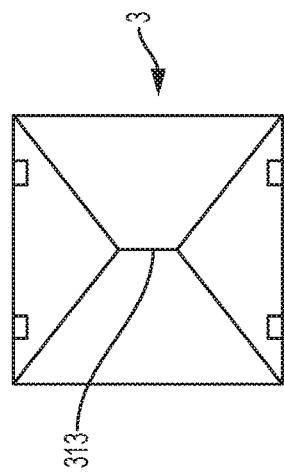
FIG. 6(b) shows a top view of the embodiment of the float of FIG.
Figure 6C:
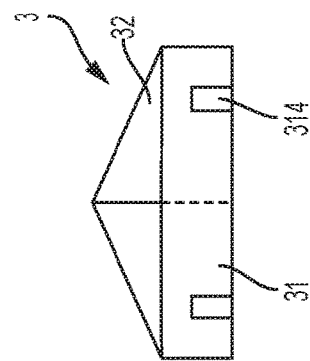
FIG. 6(a) shows an embodiment of a base of a float.
Figure 6A:
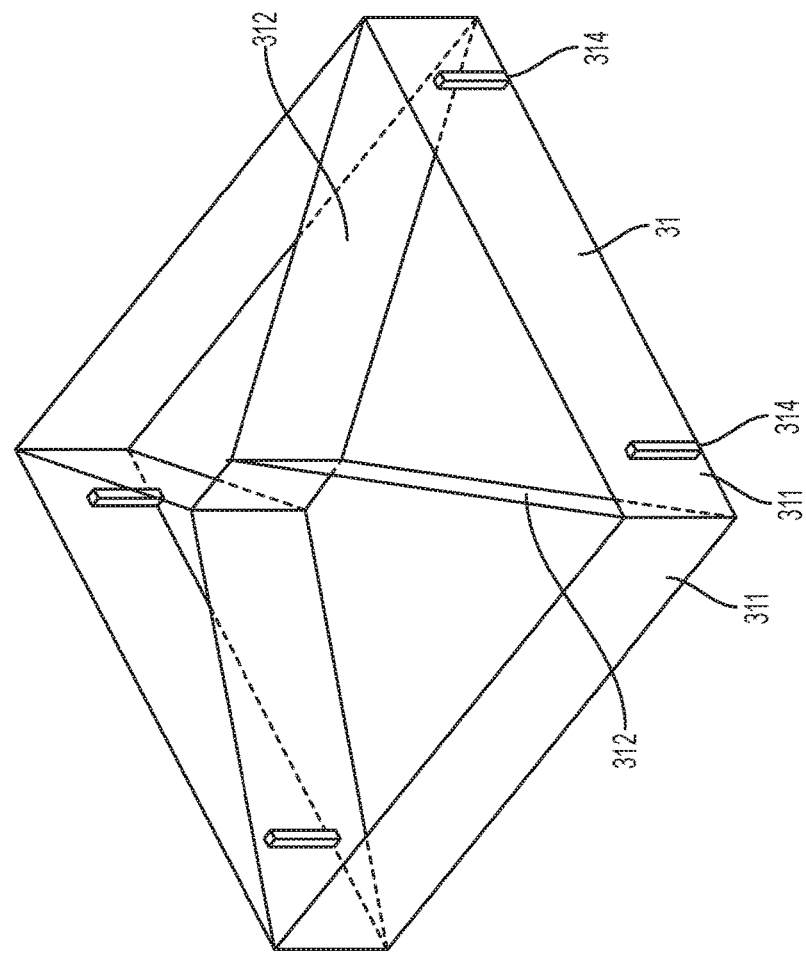
Figure 7A:
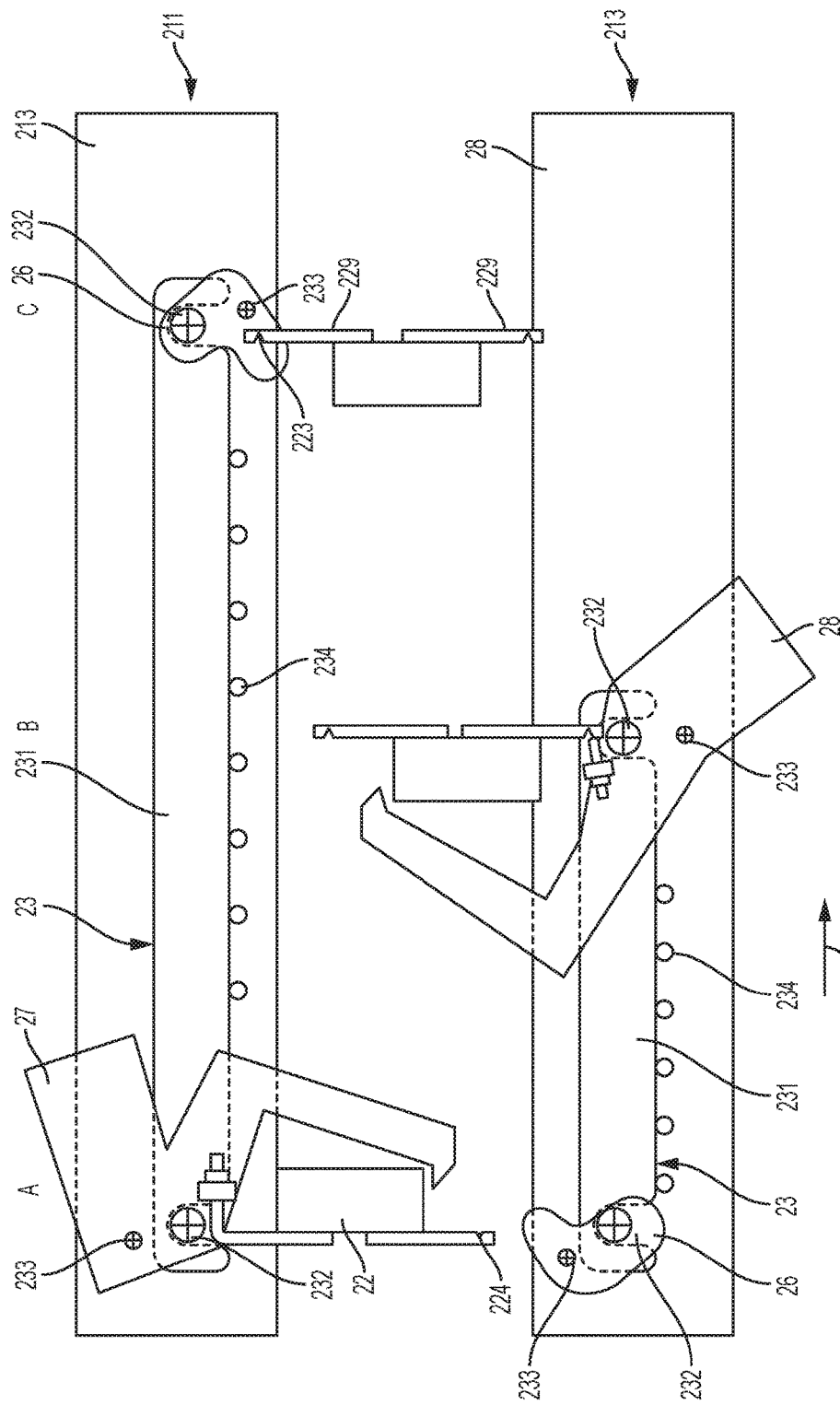
Figure 7B:
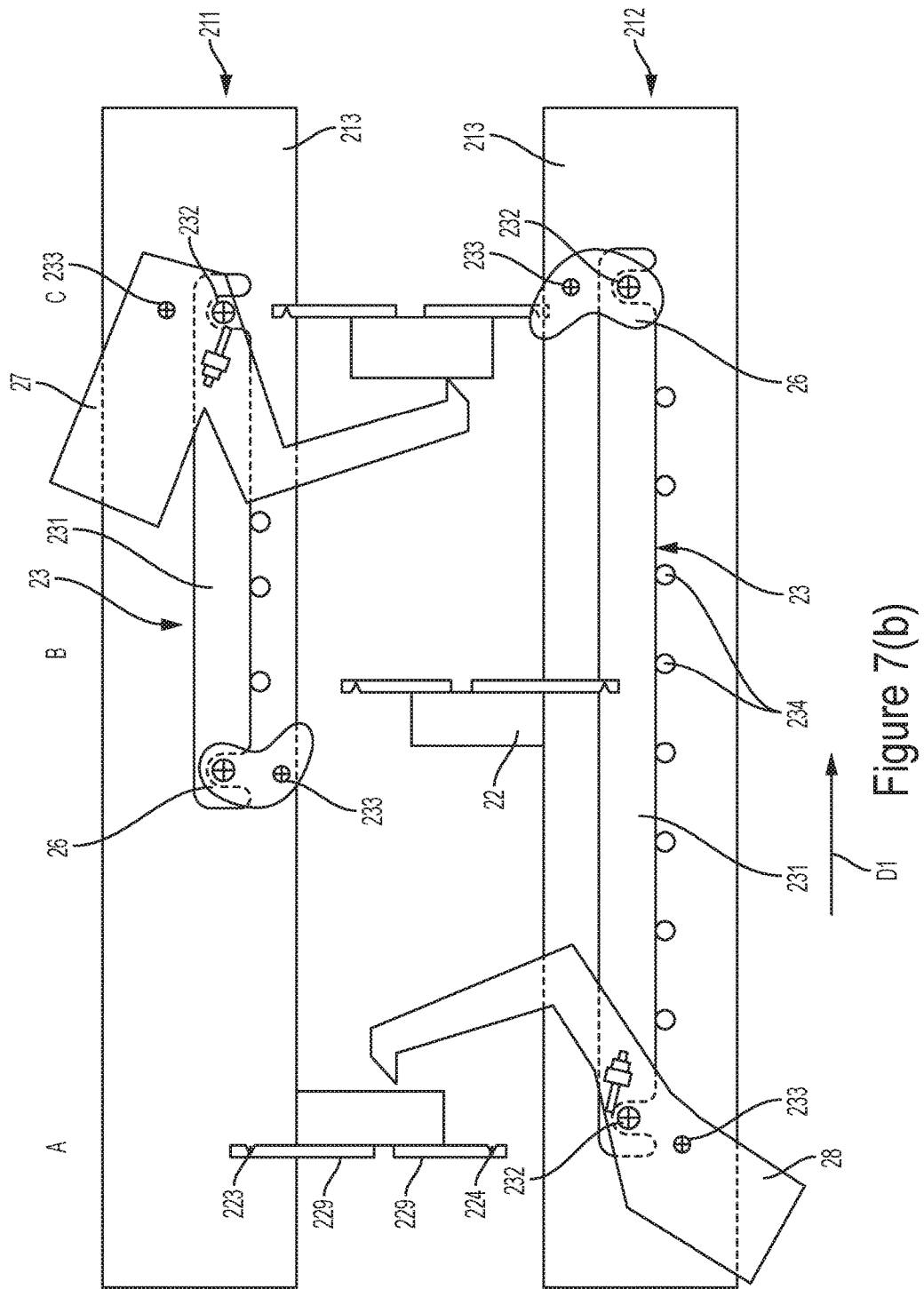
Figure 8A:
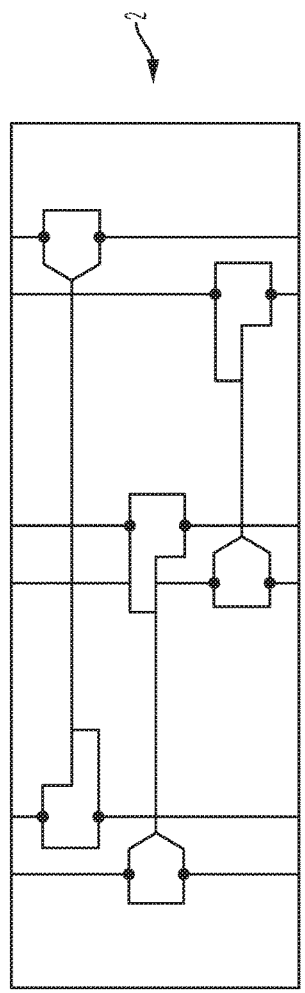
Figure 8B:
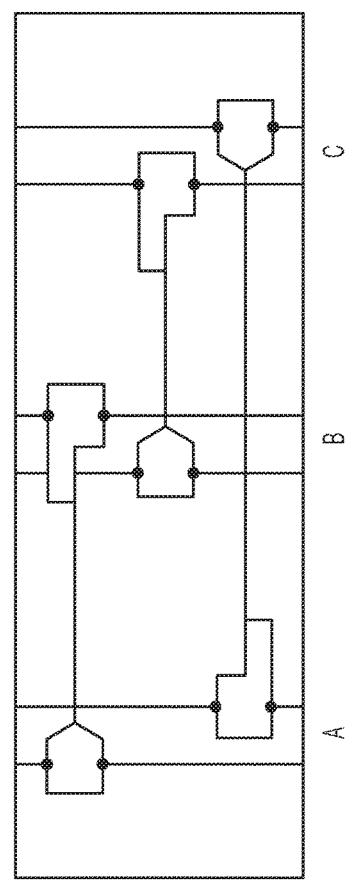
Figure 9:
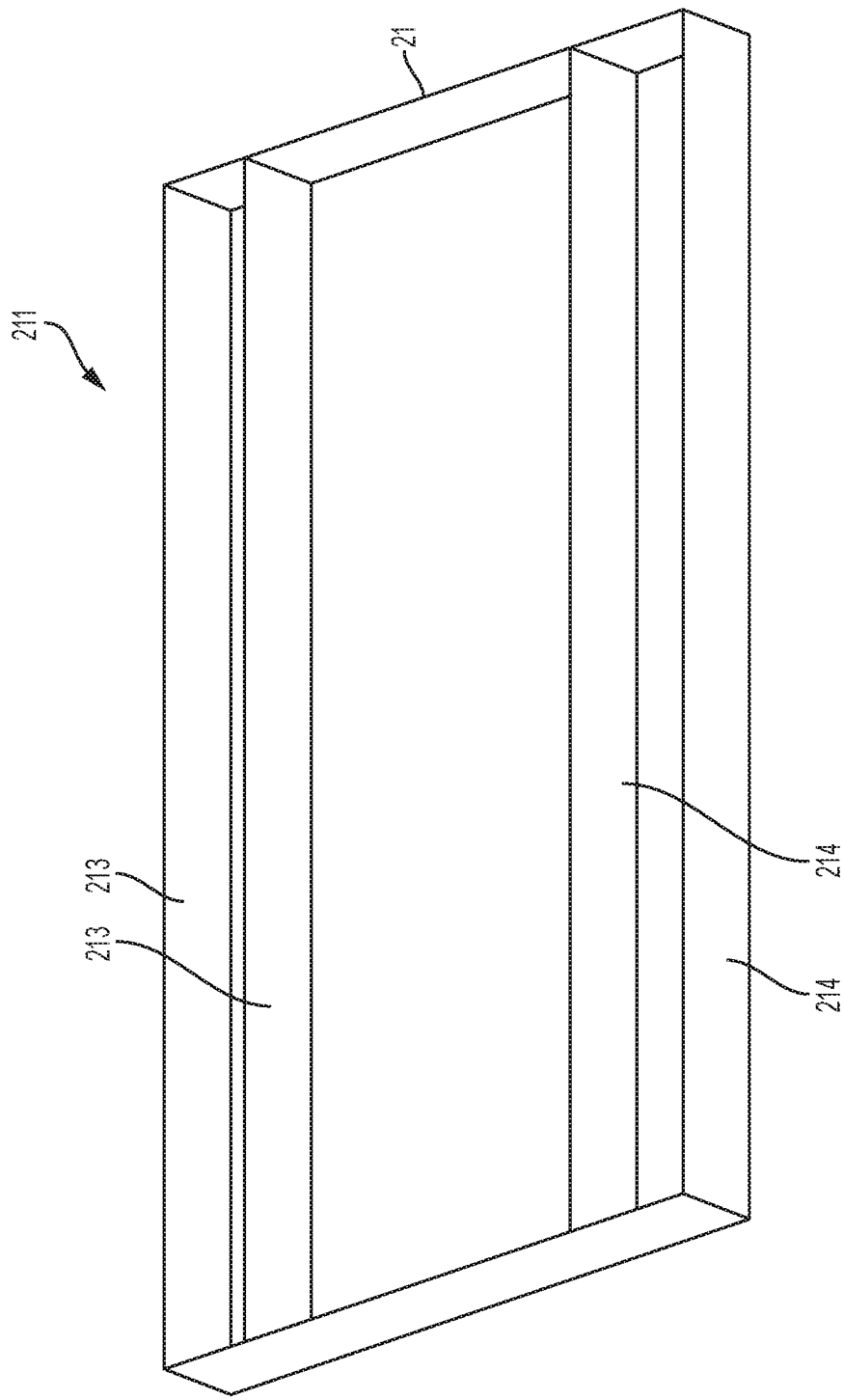
Figure 10:
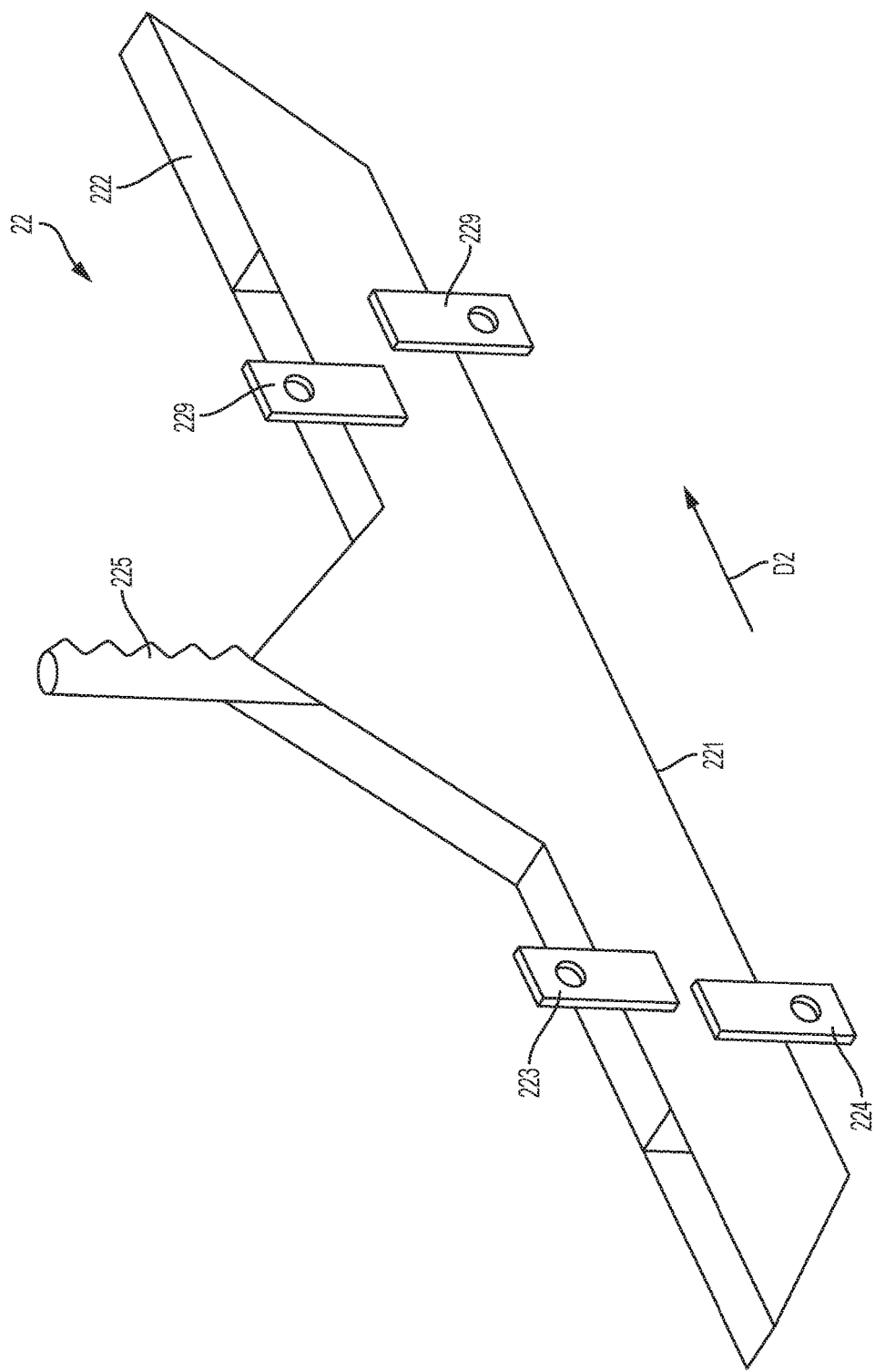
Figure 11C:
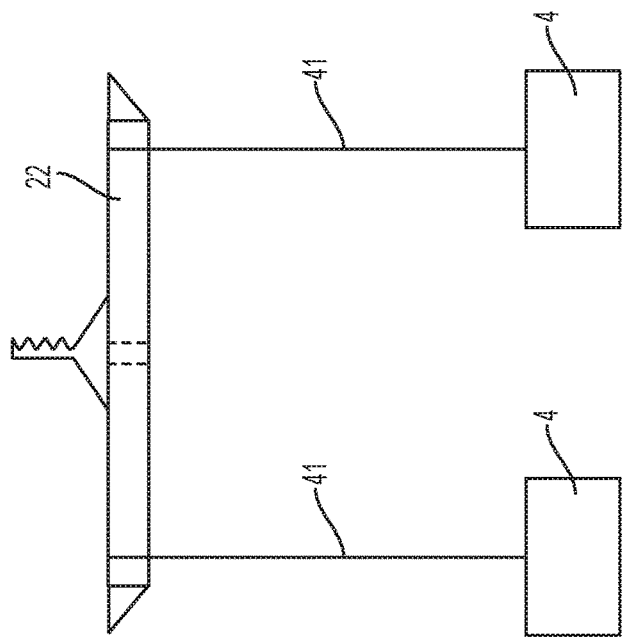
Figure 11B:
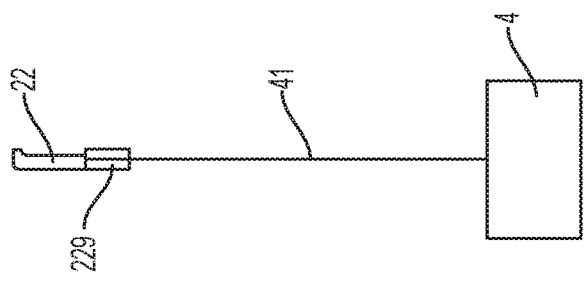
Figure 11A:
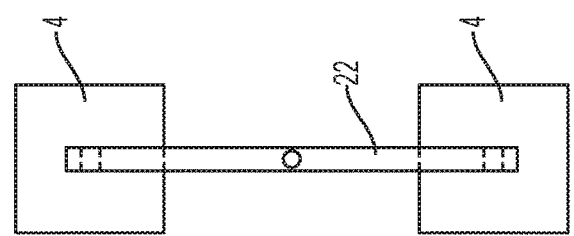
Figure 13A:
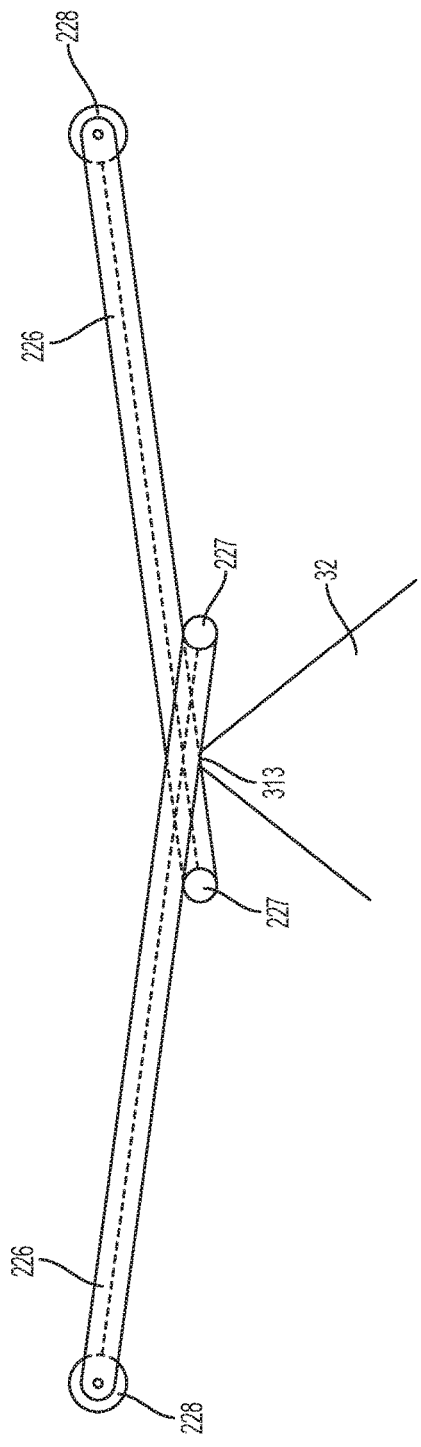
Figure 13B:
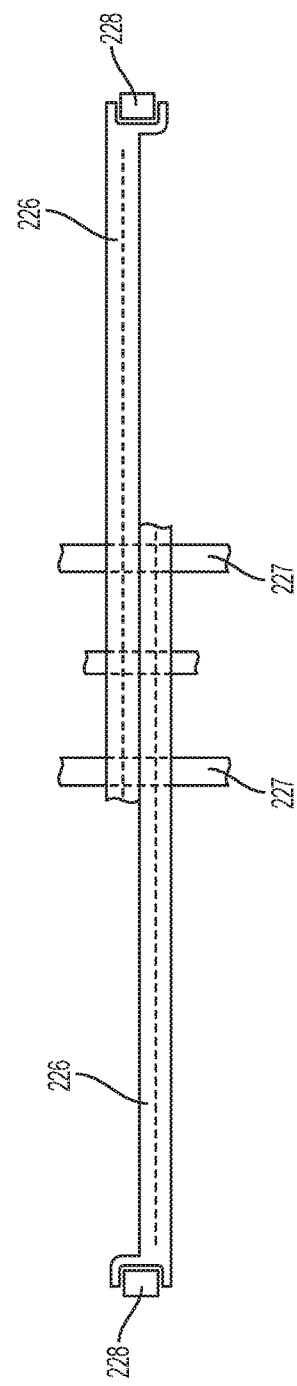
Figure 14A:
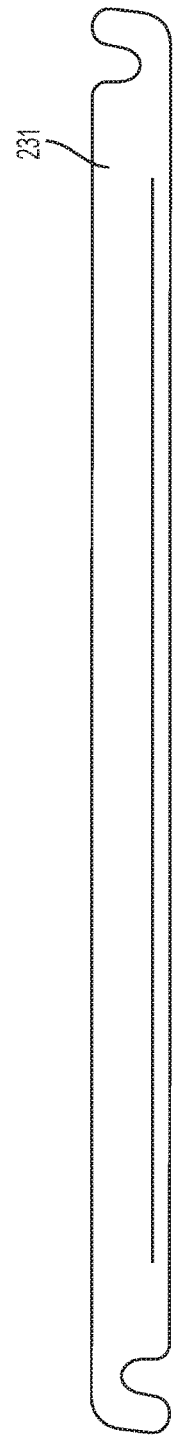
Figure 14B:
Figure 14D:
Figure 14C:
Figure 14H:
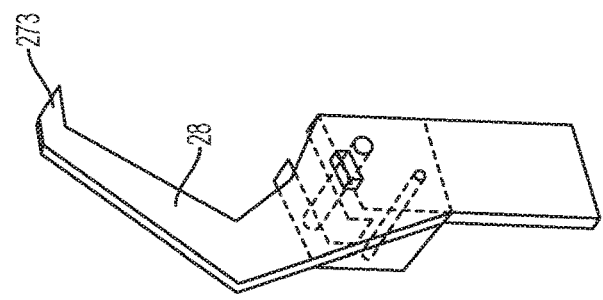
Figure 14G:
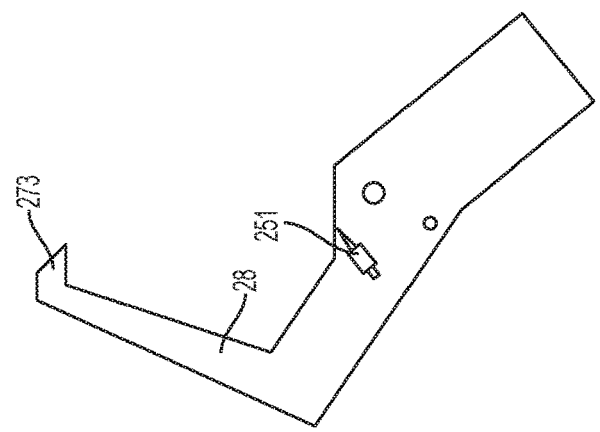
Figure 14F:
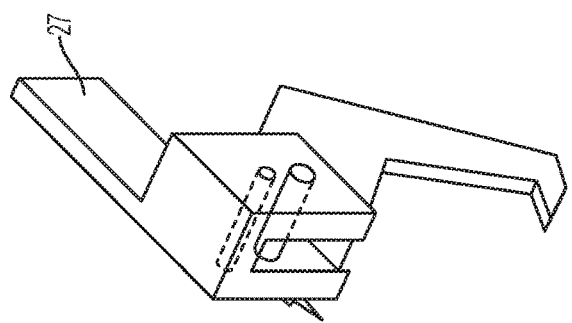
Figure 14E:
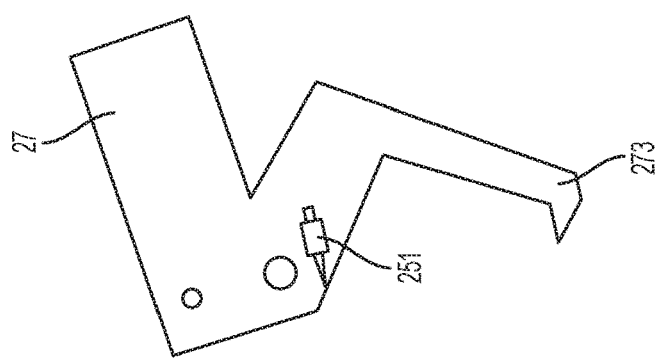
Figure 16:
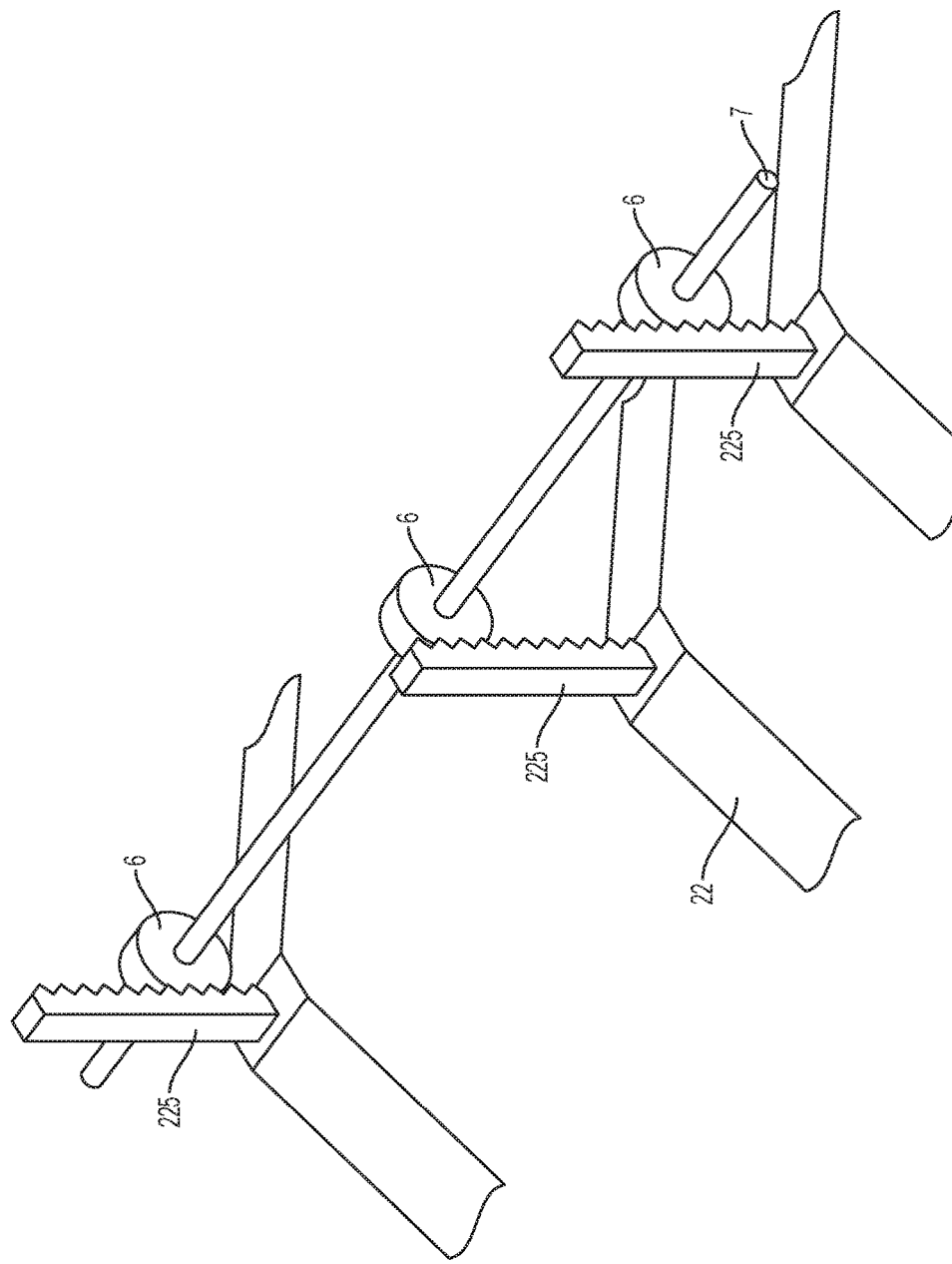

6(a), and FIG. 6(c) shows a side view of the embodiment of the float of FIGS. 6(a) and 6(b);

FIG. 7(a) shows a side view of a first linkage mechanism of an embodiment of the energy transform assembly of the disclosed technology, FIG. 7(b) shows a side view of a second linkage mechanism of the embodiment; and FIG. 7(c) shows a side view of a third linkage mechanism of the embodiment;

FIG. 8(a) is a schematic diagram of linkage mechanisms of the upper support system of the embodiment of the energy transform assembly shown in FIGS. 7(a), 7(b) and 7(c), and FIG. 8(b) is a schematic diagram of the linkage mechanisms of the lower support system of the same embodiment;

FIG. 9 depicts an embodiment of a linkage frame suitable for use with the disclosed technology;

FIG. 10 is a perspective view of a bridge of an embodiment of the disclosed technology;

FIG. 11(a) is a top view of an embodiment of plungers and a bridge of an embodiment of the disclosed technology, FIG. 11(b) is a front view of the embodiment of FIG. 11(a), and FIG. 11(c) is a side view of the embodiment of FIGS. 11(a) and 11(b);

FIG. 12(a) is a side view of a portion of an embodiment of the valve assembly of the disclosed technology, and FIG. 12(b) is a top view of the embodiment shown in FIG. 12(a);

FIG. 13(a) is an end view of an embodiment of L-shaped type 3 lever suitable for use with the disclosed technology, and FIG. 13(b) is a top view of the embodiment of FIG. 13(a);

FIG. 14(a) is a side view of an embodiment of a transfer bar of the linkage mechanism of the disclosed technology, FIG. 14(b) is a top view of the embodiment of the transfer bar of FIG. 14(a), FIG. 14(c) is a side view of an embodiment of a trigger lever of the linkage mechanism of the disclosed technology, FIG. 14(d) is a perspective view of the embodiment of the trigger lever of FIG. 14(c), FIG. 14(e) is a side view of an embodiment of the upper lock lever of the linkage mechanism of the disclosed technology, FIG. 14(f) is a peripheral view of the embodiment of the upper lock lever of FIG. 14(e), FIG. 14(g) is a side view of an embodiment of the lower lock lever of the linkage mechanism of the disclosed technology, and FIG. 14(h) is a peripheral view of the embodiment lower lock lever of FIG. 14(g);

FIG. 15 is a water movement chart showing the movement of water and bridges of an embodiment of the disclosed technology; and FIG. 16 is a perspective view of the upper portions of an embodiment the bridges associated with bearings and a driven axle.

DETAILED DESCRIPTION OF THE DISCLOSED TECHNOLOGY

As shown in the embodiments depicted in FIGS. 1-15, the disclosed technology provides an apparatus for translating energy through the use of mechanics, fluid displacement, gravity and buoyancy. The apparatus generally includes a base 1, a fluid and energy transform assembly 2 coupled with the base, a plurality of floats 3, and a plurality of plungers 4.

In the embodiments shown in FIGS. 1-16, the base 1 includes a housing 11 defined by a bottom wall 111, a top wall 112 having an underside 113, and a plurality of housing side walls 114. Formed within the housing of the base are a plurality of channels 12, and a plurality of float chambers 13 and a plurality of plunger chambers 14. As shown particularly in FIG. 4, the float chambers are aligned in a first direction D1, and the plunger chambers are aligned with the float chambers in a second direction D2 perpendicular to the first direction, with a plunger chamber positioned on each opposing side of a float chamber. In some embodiments, the plunger chambers are defined by a cross-sectional area being about one-half of the area between a float and the walls of the float chambers.

The float chambers 13 are each defined by a pair of end walls 131 and a pair of side walls 132 set within and extending from the housing, forming a vacuous float chamber area extending beyond the top wall of the housing to form a float chamber opening.

The plunger chambers 14 are provided in the apparatus in pairs of opposing chambers on each side of a float chamber, each plunger chamber being defined by an exterior plunger chamber walled perimeter 141 forming a vacuous plunger chamber area under the top wall of the housing and having a plunger chamber opening 142 through the top wall of the housing. The cross-sectional area of the plunger chamber opening is smaller than the vacuous plunger chamber area within the housing, thereby facilitating the transfer of a greater amount of fluid by the plunger, as hereinafter described.

Figure 3:
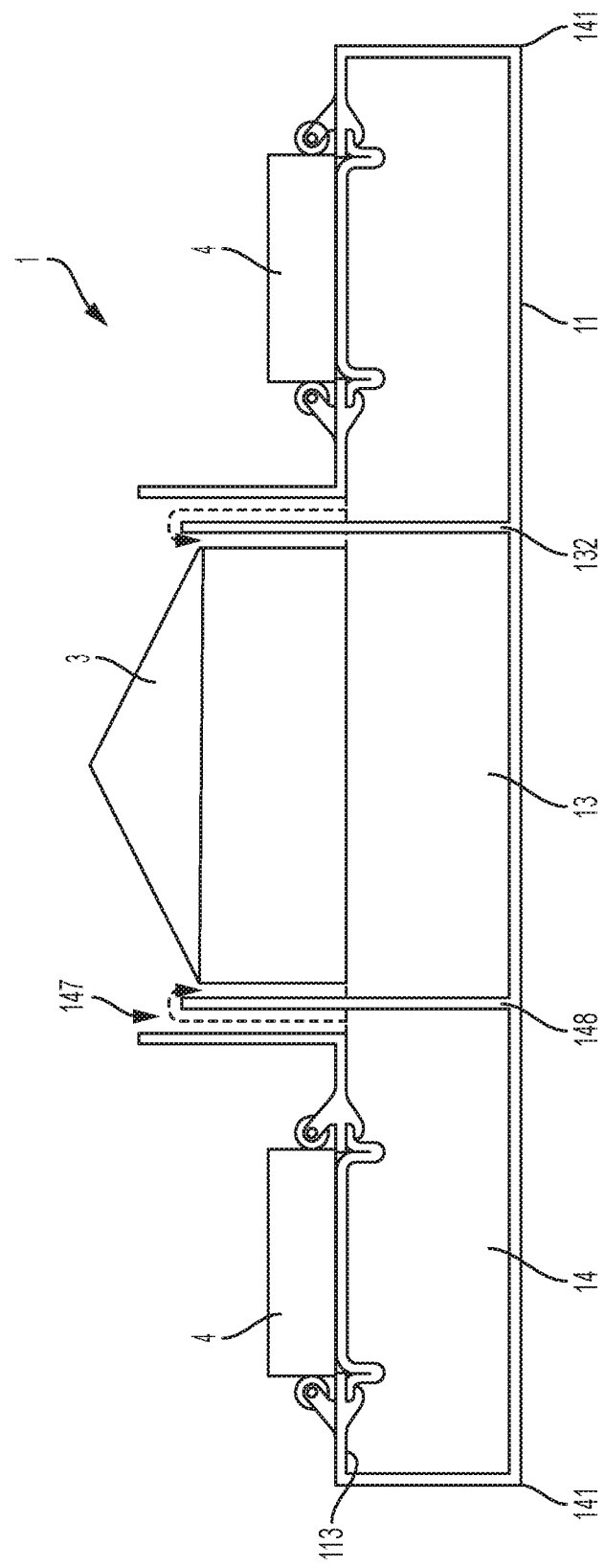
FIG. 3 shows an end view of embodiments of the float and plunger chambers of the disclosed technology.

As shown in FIGS. 3, 5(a) and 5(b), each plunger chamber 14 includes a lubricated, flexible gasket 143 made from, for example, rubber or plastic and secured about the plunger chamber opening in a tight fitting arrangement to maintain a watertight seal between the plunger chamber and the plunger chamber opening. The gasket may be positioned across the plunger chamber opening to seal the same, and is provided with sufficient flexibility to allow the plunger to move vertically within the plunger chamber, at the plunger chamber opening. In the embodiment shown, the gasket is secured to the base by means of a plurality of gasket fasteners 144 affixed to the underside of the top wall of the housing, and positioned about the plunger chamber opening. A plurality of alignment rollers 145 and brackets 146 may be affixed to the top surface of the housing, and positioned about at least portions of the plunger chamber opening, to stabilize movement of the plunger relative to the plunger chamber opening. In the embodiment shown in FIGS. 5(a) and 5(b), the alignment rollers may be positioned against the exterior depth surface of the plungers 4 to maintain the alignment of each plunger as it traverses between its depressed position (FIG. 5(a)) and its raised position (FIG. 5(b)) relative to the plunger chamber opening.

Figure 4:
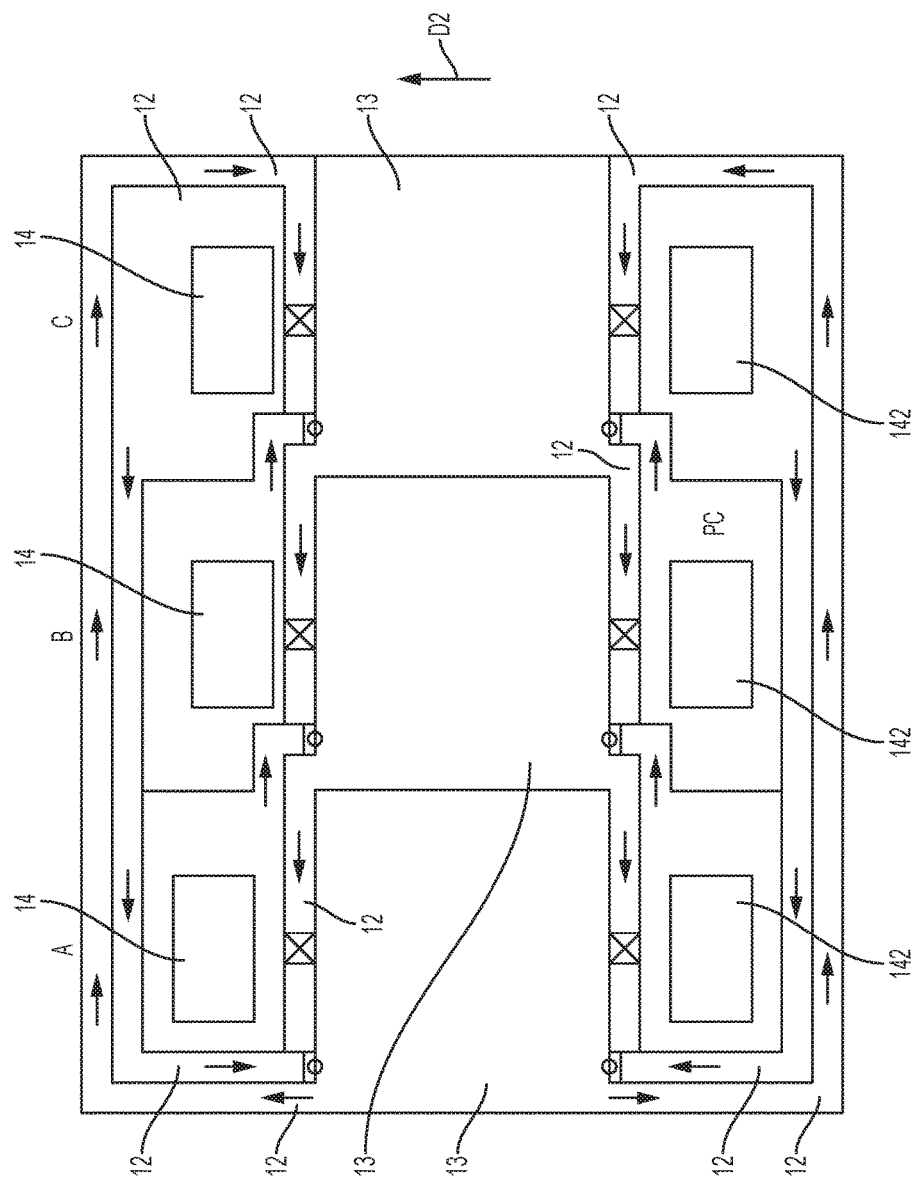
FIG. 4 shows exemplary fluid flow between chambers of the disclosed technology.

As shown in the embodiment of FIG. 4, the float chambers and the plunger chambers are in fluid communication by means of the channels 12, positioned within the housing 11. These channels may be uni-directional, with each channel facilitating the flow of fluid either from one of the plunger chambers to one of the float chambers or from one of the float chambers to one of the plunger chambers. As shown in this Figure, each pair of plunger chambers is in fluid communication with one of the float chambers that is not aligned in the second direction with the pair of plunger chambers.

To further control fluid flow within the apparatus of the disclosed technology, a plurality of vertical channels 147 are provided within the housing, each of the vertical channels being positioned adjacent to a side wall of a float chamber, and in fluid communication with a channel 12 facilitating the flow of fluid from a plunger chamber to a float chamber, as shown in FIGS. 3 and 4. The vertical channels are defined by a plurality of walls, with the vertical channel wall 148 adjacent to the float chamber having a height less than the other walls of the vertical channel, and a height equal to or greater than the adjacent side wall of the float chamber. While these and other adjacent walls of the apparatus of the disclosed technology are described distinctly, it is noted that the walls may be combined as a single wall, defining adjacent areas.

Figure 1:
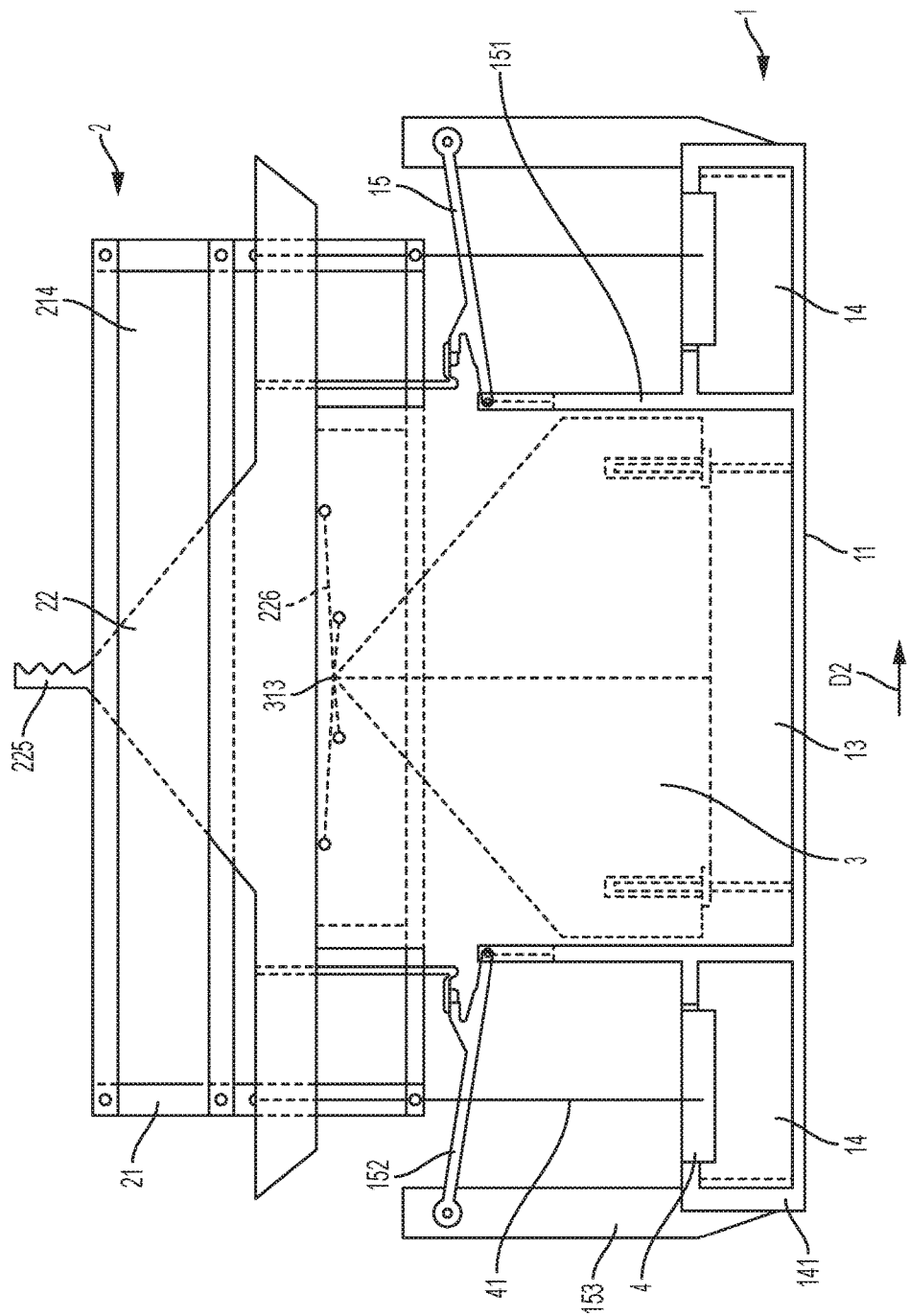
FIG. 1 shows an end view of an embodiment of the disclosed technology.
Figure 2:
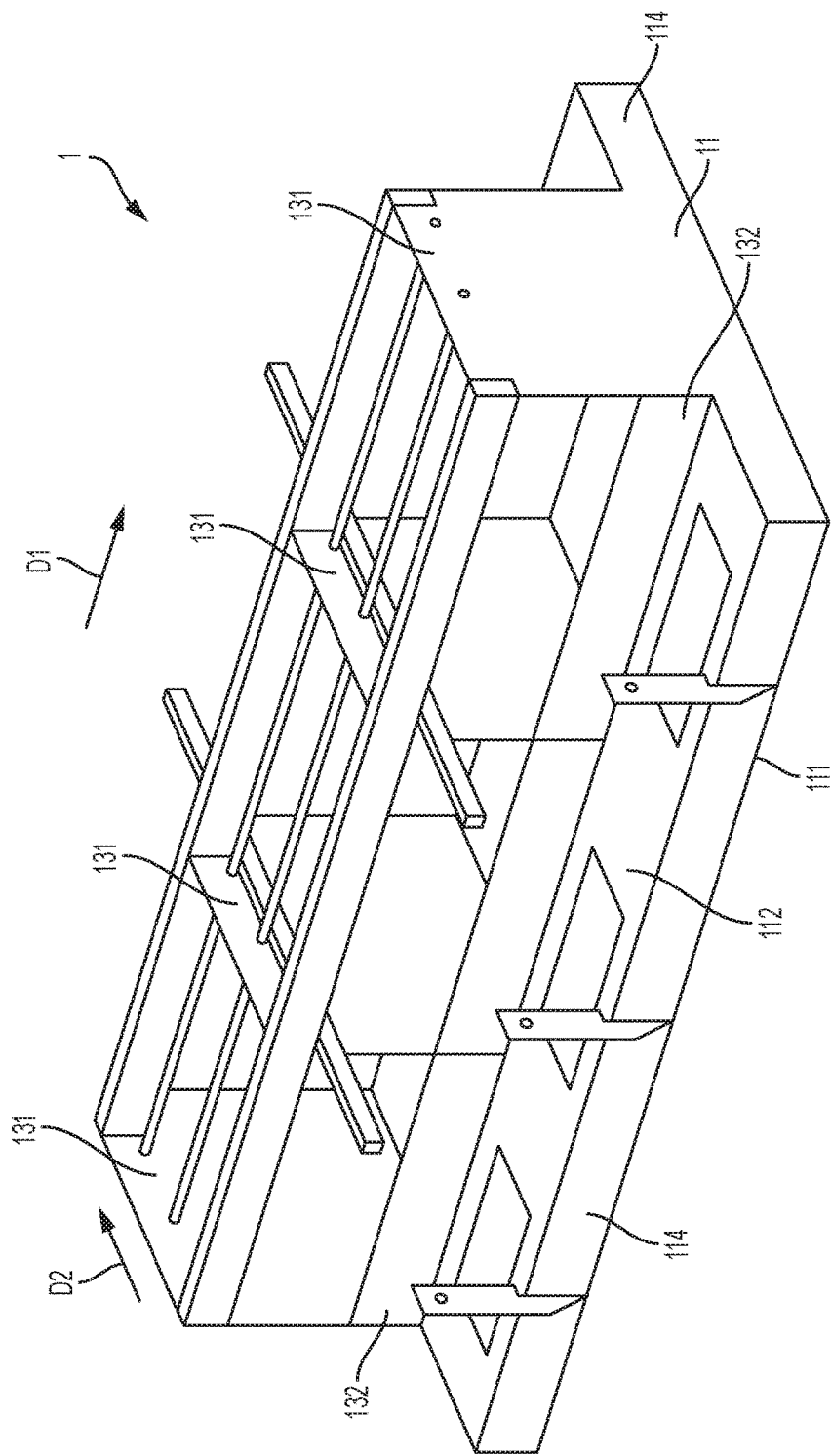
FIG. 2 shows a perspective view of portions of the housing of an embodiment of the disclosed technology.

Fluid flow is also controlled within the apparatus of the disclosed technology by a plurality of valve assemblies 15, each valve assembly being positioned within, and controlling delivery of the fluid through, the channel facilitating the flow of fluid from one of the float chambers to one of the plunger chambers. The valve assemblies may include a movable partition 151, the partition being movable between a closed position wherein the partition constrains the flow of fluid from the float chamber to the plunger chamber, and an open position wherein the partition allows the flow of fluid from the float chamber to the plunger chamber in fluid communication therewith. As shown in FIGS. 1, 12(a) and 12(b), movement of the partition between its closed position and open position may be facilitated by a lift bar 152, to which the movable partition may be rotatably affixed at one end of the bar, with the opposing end of the lift bar being rotatably affixed to a post 153 extending from the perimeter of the housing, such that as the lift bar rotates in one direction about the post, the partition is raised, and in the opposing direction the partition is lowered.

The floats 3 of the disclosed apparatus are made of lightweight, buoyant material, such as plastic, acrylic, or aluminum, and are sized and shaped to be received and move vertically within the float chambers 13, as shown in FIGS. 1, 3, 6(a) and 6(b). Generally, the floats are configured as having a float base 31 and a float body 32. The float base may have a plurality of exterior walls 311 and is sized and shaped relative to the float chamber to allow vertical movement of the float relative to the float chamber, and constrain horizontal or rotational movement of the float in the float chamber. In some embodiments, the float base also includes a plurality of interior walls 312, extending diagonally from each corner of the float base and to a center wall, to provide structural strength. The exterior walls of the float body extend from the float base exterior walls and slope to a top ridge 313. In the embodiment shown, to stabilize the float, stabilizer tubes 314 are affixed about the float base exterior walls to stabilize the float within the float chamber. When positioned in the float chamber, the float has a height extending from a still water line to just below a top edge of the end wall of the float chamber.

As shown in FIGS. 1, 3, 4, 5(a), 5(b), 11(a), 11(b) and 11(c), the plungers 4 of the disclosed apparatus are sized and configured to be received within the plunger chamber opening of the plunger chambers, with the plungers having a depth slightly higher than the depth of the plunger chamber. As particularly depicted in FIGS. 3, 5(a) and 5(b), the gasket of the plunger chamber has sufficient flexibility and material to extend into the plunger chamber as the plunger is received within the plunger chamber in its depressed position (shown in FIG. 5(a)), and to collapse generally across the plunger chamber opening when the plunger is in its raised position (shown in FIG. 5(b)). By this arrangement, the plunger and the gasket are in a tight fitting arrangement with the plunger chamber opening. In some embodiments, a top surface of the gasket of each of the plunger chambers is affixed to the bottom surface of the plunger.

As shown in the embodiments of the Figures, the energy transform assembly 2 of the apparatus of the disclosed technology includes a plurality of bridges 22 which support the valve assembly and the plungers, and a plurality of linkage mechanisms, mechanically engaged with the bridge.

Referring to FIGS. 1, 7(a)-(c) and 8(a)-(b), the energy transform assembly 2 of the apparatus of the disclosed technology is coupled with some of the walls of the float chamber base by means of threaded fasteners, extends in the first and second directions, and includes a frame 21 having an upper support structure 211 and a lower support structure 212, the frame including a plurality of vertical support structures. Each of the upper and lower support structures having a plurality of plates 213, 214, the plates secured in a parallel fashion to the frame, with a first set of plates 213 extending in the first direction and positioned on one side of the float chambers, and a second set of plates 214 extending in the first direction and positioned on the opposing side of the float chambers. In the embodiments shown, the tops of the end walls of the float chamber are coplanar with the top edge of the plates of the lower support structure.

As shown in FIGS. 1, 7(a), 7(b), 7(c) and 10, the bridges 22 of the energy transform assembly are defined by an underside 221 and a top elongated surface 222, and positioned along their length in the second direction D2, over a pair of plunger chambers aligned with a float chamber. The bridges are movable between an upper position (shown, for example, in FIG. 7(a), position A) with its top elongated surface in contact with the bottom of the upper support structure 212, and a lower position (shown, for example, in FIG. 7(a), position B), with its underside in contact with the top of the lower support structure 211, maintained in its horizontal position relative to the frame by the vertical support structures of the frame. Each of the bridges 22 is further positioned to receive contact from the top ridge 313 of the float, as it traverses upward in the float chamber, the upward thrust of the float (created by buoyancy of the float in the filled float chamber) thereby causing vertical upward movement of the bridge from its lower position to its upper position. As shown in FIGS. 1, 13(a) and 13(b), secured to the apparatus of the disclosed technology are a plurality of levers 226, such as L-shaped type 3 levers each rotatably affixed at one end by means of an axle 227 to the lower support structure or the end walls of the float chamber, and positioned to extend along a portion of the length of each bridge, and receive contact by the float as it vertically traverses within the float chamber. Rollers 228 are secured at an opposing end of each lever, and engage with the underside of each bridge. In the embodiment shown, the top ridge of the float contacts the lower ends of the L-shaped levers, translating a lesser force to the ends of the levers, at the rollers, and thereby to the bridge.

As shown in FIGS. 1, 7(a), 7(b), 7(c) and 10, each of the bridges has an upper lock pin aperture 223 and a lower lock pin aperture 224 on each of the top and bottom couplings 229, the upper and lower lock pin apertures being aligned respectively with the needle lock pin of the corresponding upper and lower lock levers, when the bridge is respectively in the upper position and the lower position. Each of the bridges further includes a toothed center rod 225 designed and configured to couple with a directional bearing 6 that will drive one direction, and return freely without friction in the other direction (see, e.g., FIG. 16) to translate vertical upward movement of the bridge to rotational movement of the bearing, and thereby drive an axle 7 which may be used to power a fan or other device requiring rotational energy.

Each bridge further includes a valve assembly post 155 extending from a coupling 229 affixed to a side of the bridge, the valve assembly post terminating in a hook 156 for engagement with a releasable coupling mechanism of the valve assembly, as shown in FIGS. 12(a) and 12(b). In this embodiment, the lift bar 152 includes a tangential branch 157 extending from a mid-portion of the lift bar to support a releasable coupling mechanism at the end of the tangential branch, wherein the releasable coupling mechanism 154 is positioned so that when the hook is at its lowest position, it secures to the hook and as the bridge raises, it lifts the end of the lift bar and thereby raises the partition, rotating the lift bar about the post. When the bridge reaches the upper position, the releasable coupling mechanism based upon its design and configuration no longer engages with the hook, and is released, causing the partition to fall back in-between the float chamber and the plunger chamber, sealing the opening between the float chamber and the plunger chamber.

As shown in FIGS. 1, 11(a), 11(b) and 11(c), each of the plungers 4 of the energy transform assembly are also coupled with the bridge by means of a rigid plunger post 41 extending from another coupling 229, the plunger post being affixed at one end to the coupling and at the other end to the plunger, wherein the plunger post is positioned on the bridge so that the plungers are vertically aligned with the plunger chamber openings.

Referring now to FIGS. 7(a)-(c), 8(a)-(b) and 14(a)-(h), the linkage mechanisms 23 of the energy transform assembly are supported by the upper and lower support structures. These linkage mechanisms reset due to gravitational force, and transfer movement through the components of the linkage mechanisms, as engaged by and controlling movement of the bridge, providing a catch and release for proper movement and transfer of power through the sequence of the process. Each linkage mechanism is secured to a plate 213, 214 of a support structure of the frame, and includes a pair of levers 26, 27, 28 and an elongated transfer bar 231, with each lever rotatably affixed to opposing ends of the transfer bar by means of a drive pin 232, the transfer bar having elongated apertures to receive the drive pins in a manner to translate rotation of either lever with lateral movement of the transfer bar, and lateral movement of the transfer bar causes rotation of an opposing lever of the linkage mechanism. Each lever is further rotatably affixed to a plate of the upper support structure or the lower support structure by means of a lever axle 233, the lever axle extending between two corresponding plates on one or the other side of the aligned float chambers. One end of the lever axles may be further supported through the side walls of the float chambers. The transfer bars are movably supported on a plurality of rollers 234, the rollers being rotatably affixed by axles to the plates on the corresponding side of the float chamber.

In the embodiment shown, the levers comprise lock levers 27, 28 and trigger levers 26, with one lock lever and one trigger lever engaged with opposing ends of each transfer bar. As shown in FIGS. 14 (e)-(h), each lock lever includes a needle lock pin 251 secured to a side of the lock lever, extending parallel with the lock lever surface, positioned to engage with a lock pin aperture of the couplings of the bridge, when aligned. By means of the lever axle 233, the levers are each rotatable between an affected position and a rest position.

In these embodiments, and particularly in FIGS. 7(a), 7(b) and 7(c), the lock levers may be presented as upper lock levers (shown in FIGS. 14(e) and 14(f)) rotatably affixed to a plate of the upper support structure, and lower lock levers (shown in FIGS. 14(g) and 14(h)) rotatably affixed to a plate of the lower support structure. In this arrangement, the lock levers are shaped and the lever axle is received and positioned on the lock lever to distribute the weight thereof so that gravity rotates the lock lever about its axle to a rest position (shown, for example, in FIG. 7(a)), unless the transfer bar or the bridge impede the lock lever from such position, and into its affected position (shown, for example, in FIGS. 7(b) and 7(c)). When in the rest position, the needle lock pin of the lock lever is received within the aligned lock pin aperture of the bridge linkage 229.

As shown in the Figures, the upper lock levers 27 are rotatably affixed to the upper support structure such that the needle lock pins are positioned to be received within the upper lock pin aperture of the corresponding bridge linkage to lock the bridge up when the upper lock levers are in their rest position, and the lower lock levers 28 are rotatably affixed to the lower support structure and likewise include needle lock pins to be received within the lower lock pin aperture of the corresponding bridge linkage to lock the bridge down when in the rest position. As shown in FIGS. 7(a)-(c) and 14(e)-(h), one end of each of the lock levers comprises an angled tip 273 to facilitate rotation of the lock lever by gravity, as the bridge passes past the angled tip of the lock lever.

In the configurations shown, the upper lock lever 27 is positioned relative to a bridge so that when the lever rotates from the rest position (the rotation being caused by lateral translation of the transfer bar associated therewith), the needle pin is removed from the aperture of the bridge linkage and the bridge (and its plungers) falls by gravity. Continuing with this configuration, a lower lock lever 28 associated with the same bridge is in an affected position relative to the bridge so that its angled tip rests on a side of the bridge until the top elongated surface of the bridge passes the angled tip, at which point gravity and the weighted design of the lower lock lever cause the lower lock lever to rotate (the angled tip no longer being held out by the bridge) to its rest position. In its rest position, the needle lock pin of the lower lock lever is received in the needle lock aperture of the bridge linkage. This rotation of the lower lock lever horizontally translates the transfer bar to which it is affixed, rotating the trigger lever at the opposing end of the transfer bar to an affected position (see, e.g., FIG. 7(a)).

As shown in FIGS. 7(a)-(c) and 14(c)-(d), the trigger levers 26 of the linkage mechanisms have a generally circular base with an angled tip 261 protruding therefrom to produce a weighted configuration allowing gravity to rotate the trigger lever to a rest position when not inhibited by the bridge or the transfer bar. Further, the bridges by contact rotate the angled tips of the trigger levers to an affected position when the bridge is in its lower position or upper position relative to the position of the trigger lever. As shown in the embodiments of FIGS. 7(a), 7(b) and 7(c), the trigger levers include upper trigger levers affixed to the upper support structure and lower trigger levers affixed to the lower support structure, and with each positioned so that when the bridge is in its upper position, the bridge contacts the angled tip and moves the upper trigger lever to its affected position, and when the bridge is in the lower position, it contacts the angled tip and moves the lower trigger lever to its affected position (see, specifically, FIG. 7(b)). Notably, when the trigger lever is rotated to its affected position, it translates the transfer bar to which it is affixed, and causes the associated lock lever on the opposing end of the transfer bar to assume its affected position regardless of the position of the bridge associated with the lock lever.

Each trigger lever is rotationally affixed to a plate of the upper support structure or the lower support structure by means of an axle 233, extending through an aperture positioned on the trigger lever base, the axle extending between two corresponding plates on one side of the aligned float chambers. One end of the axles may run through the side walls of the float chambers or the linkage frame. The position of the aperture of the trigger lever receiving the axle, with the weighted configuration of the trigger lever, causes gravity to rotate the trigger lever into its rest position when not impeded by the bridge or the associated transfer bar.

As shown in FIGS. 7(a), 7(b) and 7(c), each of the trigger levers are engaged with a corresponding transfer bar by means of a drive pin 232, wherein rotation of the trigger lever about the trigger lever axle laterally translates the transfer bar, and lateral translation of the transfer bar causes rotation of the trigger lever. As hereinabove discussed, the lock lever positioned on the opposing end of a transfer bar likewise rotates in response to lateral translation of the transfer bar, and causes the lateral translation of the transfer bar in response to the rotation of the lock lever.

Notably, when the bridge is released from a locked lower position, and the float causes the bridge to raise to its upper position as hereinabove described, gravity causes the lower trigger lever associated with the bridge to rotate from its active to its rest position, which rotation translates the associated transfer bar. This lateral translation of the transfer bar no longer holds the lower lock lever affixed to the opposing end of the transfer bar in its affected position, allowing it to rotate to its rest position once the bridge passes past the angled tip (the bridge holding the lower lock lever in its affected position until it passes past the angled tip of the lower lock lever).

Generally, when in the rest position the lock lever locks the bridge in its respective position, with the upper lock lever locking the bridge in its upper position and the lower lock lever locking the bridge in its lower position, in each case by means of the needle lock pin of the lock lever and the lock pin aperture of the coupling of the bridge. The lock levers are rotated from their rest position, and therefore no longer lock the bridge at a specific position, upon rotation of a trigger lever at an end of the transfer bar opposing the lock lever; this rotation is caused by the upward or downward movement of another bridge associated with the trigger lever, wherein when the other bridge moves down it causes a lower trigger lever to assume an affected position, and when it moves up it causes an upper trigger lever to assume an affected position.

The vertical fall of the bridge resulting from an unlocking of the upper lock lever causes the plungers associated with the bridge to push water through a channel into a float chamber. The unlocking of a bridge causes the float in the float chamber to use buoyancy to push the bridge back up to an upper position, which the upper lock lever locks into place as hereinabove described. As the bridge rises to the upper position, it pulls the associated partitions of the valve assembly up, allowing fluid to move from a float chamber to a plunger chamber in fluid communication with the float chamber; when the bridge reaches the upper position, the partitions are released, and resume their position between the chambers.

The configurations hereinabove described are shown in particular in FIGS. 1, 4, 7(a), 7(b), 7(c), and 15. In the embodiments shown in these Figures, the apparatus includes three bridges, each bridge aligned with a pair of plunger chambers and a float chamber. An end view showing one bridge, and the three chambers, is provided in FIG. 1. As shown in the flow pattern depicted in FIG. 4, the fluid communication among the chambers is not among aligned chambers, so for example the plunger chamber aligned with bridge A, is in fluid communication with the float chamber aligned with bridge B. The positioning of the bridges and the flow of fluid is also shown in FIG. 15. While the plungers and valve assemblies cause the fluid to flow among chambers as described in these systems, it is the position of the bridge (up or down) that controls the plungers and valve assemblies; therefore, the linkage systems shown in FIGS. 7(a), 7(b) and 7(c) are relevant. These systems are positioned on a plurality of plates positioned above the plunger chambers, on each side of the float chamber, and control the positional locking and unlocking of the bridges. As is evident from the drawings, the linkage systems include communication between the bridges A, B and C.

Stepping through the processes of the system of the disclosed technology, and referring to the linkages shown in FIGS. 7(a), 7(b) and 7(c), at the point in the process shown bridge C is rising between its lower position and its upper position; upon reaching the upper position, the bridge C pushes against an end of the upper trigger lever, causing it to rotate. Rotation of the upper trigger lever associated with bridge C causes the transfer bar affixed thereto to translate laterally, resulting in rotation of the upper lock lever at the opposing end of the transfer bar from its rest to its affected position, thereby releasing its lock on bridge A (see upper linkage of FIG. 7(a)). Further, when bridge C reaches its upper position, the upper lever lock associated with bridge C rotates by gravity, locking the needle lock pin thereof into the lock pin aperture of bridge C, which also translates the transfer bar associated therewith and rotates the trigger lever associated with bridge B to the rest position (see upper linkage of FIG. 7(c)). As bridge C rises, the valve assembly and associated partitions also rise, allowing fluid to flow from the float chamber to certain plunger chambers to reach an equilibrium; when bridge C reaches its upper position, the partitions are released and return to seal fluid communication between the float chamber and the plunger chambers.

When the lock on bridge A is released, the bridge falls, and when it reaches its lower position it rotates the lower trigger lever associated with bridge A to its affected position, thereby laterally moving the transfer bar, resulting in the rotation of the lower lock lever associated with bridge B to its affected position, releasing bridge B (see lower linkage of FIG. 7(a)). Further, when bridge A reaches its lower position, the associated lower lock lever rotates by gravity to its rest position, thereby locking bridge A down by means of the needle lock pin of the lock lever and the lock pin aperture of bridge A. Rotation of the lower lock lever associated with bridge A further results in lateral movement of the transfer bar, and rotation of the trigger lever at the opposing end of the transfer bar into its rest position (see lower linkage of FIG. 7(c)). Finally, as bridge A falls, the plungers associated with the bridge also move vertically down into their plunger chambers, forcing fluid from the vacuous plunger chamber area into a float chamber.

As bridge B is released, the buoyancy of the float in the associated float chamber pushes the bridge up to its upper position, wherein the upper lock lever associated with bridge B rotates to its rest position, thereby locking the bridge up; such rotation translates into lateral movement of the associated transfer bar, and rotates the upper trigger lever associated with bridge A to its rest position (see upper linkage of FIG. 7(b)). As bridge B achieves its upper position, it pushes against the end of the upper trigger lever at the opposing end of the transfer bar associated with bridge B, causing it to rotate; by such rotation, the transfer bar associated with bridge B translates, causing the upper lock lever associated with bridge C and at the opposing end of the transfer bar to rotate to its affected position, thereby unlocking bridge C (see upper linkage, FIG. 7(c)). Further, as bridge B rises, the valve assembly and associated partitions also rise, allowing fluid to flow from the float chamber to certain plunger chambers to reach an equilibrium; when bridge B reaches its upper position, the partitions are released and return to seal fluid communication between the float chamber and the plunger chambers.

As bridge C falls to its lower position, the lower lock lever associated with bridge C rotates to its rest position, locking bridge C down, which rotation laterally translates the associated transfer bar, and rotates the trigger lever at the opposing end of the transfer bar into its affected position (see lower linkage, FIG. 7(b)). Further, with bridge C assuming its lower position, it pushes against the lower trigger lever associated with bridge C, causing it to rotate, thereby laterally translating its associated transfer bar and rotating the lower lock lever associated with bridge A and at the opposing end of the transfer bar to its affected position, thereby releasing bridge A from its locked position (see lower linkage, FIG. 7(c)). Finally, as bridge C falls, the plungers associated with the bridge also move vertically down into their plunger chambers, forcing fluid from the vacuous plunger chamber area into a float chamber.

Bridge A then rises, causing rotation of the upper lock lever associated with bridge A, resulting in lateral movement of the transfer bar associated therewith, and the upper trigger lever associated with bridge C and at the opposing end of the transfer bar to assume an affected position (see upper linkage, FIG. 7(a)). With bridge A assuming its upper position, it pushes against the upper trigger lever associated with bridge A, translating the transfer bar affixed thereto, and rotating the upper lock lever associated with bridge B and at the opposing end of the transfer bar, thereby unlocking bridge B from its upper position (see upper linkage, FIG. 7(b)). Further, as bridge A rises, the valve assembly and associated partitions also rise, allowing fluid to flow from the float chamber to certain plunger chambers to reach an equilibrium; when bridge A reaches its upper position, the partitions are released and return to seal fluid communication between the float chamber and the plunger chambers.

As bridge B falls and assumes its lower position, it pushes against the lower trigger lever associated with bridge B, causing the lateral movement of the transfer bar, which results in the rotation of the lower lock lever of bridge C at the opposing end of the transfer bar to release the bridge (see lower linkage of FIG. 7(b)). As the bridge B assumes its lower position, the lower lever lock associated with bridge B rotates by gravity, pulling the transfer bar to the right, and rotating the lower trigger lever associated with bridge A at the opposing end of the transfer bar into its affected position (see lower linkage, FIG. 7(a)). The process then continues with bridge C rising as hereinabove described. Finally, as bridge B falls, the plungers associated with the bridge also move vertically down into their plunger chambers, forcing fluid from the vacuous plunger chamber area into a float chamber.

In an exemplary embodiment of the disclosed technology, the weight of two plungers and their connected bridge may be 18 lb. Each plunger may displace 40 cubic inches of water in a 1" stroke. At 9 lb. per plunger, the water is lifted over 4", to spill over and flow into a float chamber. An 18" width×18" depth×4" height float stores a total upward thrust of 98.55 lb., and in a ⅛" stroke of the float the force is applied to a 0.25" contact area and collects 394 lb. of pressure. The pressure applied to type 3 levers with an 8-to-1 ratio delivers 49.25 lb. of pressure to a plunger and bridge assembly weighing 18 lbs. The decreasing usable pressure for each 1" stroke is 31.25 lb. to 6.625 lbs.

The foregoing descriptions of specific embodiments of the disclosed technology have been presented for purposes of illustration and description. They are not intended to be exhaustive, or to limit the claimed invention to the precise forms disclosed, and many modifications and variations are possible in light of the above teachings. The exemplary embodiments were chosen and described in order to best explain the principles of the disclosed technology and its practical application, to thereby enable others skilled in the art to best utilize the disclosed technology, and various embodiments with various modifications as are suited to the particular use are contemplated.

The invention claimed is:

1. An apparatus for translating energy through the use of mechanics, fluid displacement, gravity and buoyancy, the apparatus comprising:
   a base comprising a housing having a top wall extending over portions of the base, a plurality of float chambers formed within and extending from the base, the float chambers being defined by sides and ends, and a plurality of plunger chambers formed within the housing,
       wherein the float chambers and the plunger chambers are in fluid communication by means of a plurality of channels,
       wherein the float chambers are aligned in a first direction, and two plunger chambers are aligned with, and on opposing sides of, each float chamber in a second direction perpendicular to the first direction,
       wherein each of the float chambers is in fluid communication with two of the plunger chambers that are not aligned in the second direction with the float chamber,
       wherein the base further comprises a plurality of valve assemblies, each valve assembly being positioned within the base to control delivery of fluid from one of the float chambers to one of the plunger chambers, and
       wherein each of the plunger chambers comprises a vacuous plunger chamber area under the top wall of the housing and a plunger chamber opening through the top wall of the housing, with a flexible gasket secured about the plunger chamber opening to maintain a watertight seal between the vacuous plunger chamber area and the plunger chamber opening;
   a plurality of floats made of a buoyant material, sized and shaped to be received and traverse vertically within the float chambers;
   a plurality of plungers sized and configured to be received within the plunger chamber openings of the plunger chambers; and
   an energy transform assembly coupled with the base, comprising:
       a frame supporting an upper support structure and a lower support structure, each of the upper and lower support structures positioned on both sides of the float chambers, and extending in the first direction,
       a plurality of bridges, each bridge being positioned along its length in the second direction, over a pair of the plunger chambers aligned with one of the float chambers, and further being movable between the upper support structure and the lower support structure,
           wherein the bridges are respectively positioned to receive contact from one of the floats, as the float traverses upward in the float chamber, the upward traversion of the float thereby causing vertical upward movement of the bridge, wherein each of the bridges comprises a toothed center rod designed and configured to couple with a directional bearing to translate vertical upward movement of the bridge to rotational movement of the bearing, wherein each of the plungers are coupled with the bridge by means of a plunger post, wherein the plunger post is positioned on the bridge so that the plungers are vertically aligned with the plunger chamber openings; and a plurality of linkage mechanisms supported by the upper support structure and a plurality of linkage mechanisms supported by the lower support structure, wherein each linkage mechanism comprises a pair of levers and an elongated transfer bar, with each lever rotatably affixed to an opposing end of the transfer bar in a manner to translate rotation of one lever with lateral movement of the transfer bar and lateral movement of the transfer bar causes rotation of the other lever.

2. The apparatus of claim 1, wherein the gasket is secured to the underside of the top wall of the base, about the plunger chamber opening, the gasket having sufficient flexibility to allow the plunger to move vertically within the plunger chamber, at the plunger chamber opening.

3. The apparatus of claim 2, wherein the gasket is secured to the housing by means of a plurality of gasket fasteners, the gasket fasteners being affixed to the underside of the top wall of the housing, and positioned about the plunger chamber opening, and wherein each of the plungers has a depth greater than a depth of the plunger chamber.

4. The apparatus of claim 1, wherein the base further comprises a plurality of alignment rollers, each alignment roller rotatably secured to the housing by a bracket, the alignment rollers being positioned about at least portions of the plunger chamber opening and against the exterior depth surface of the plunger to maintain the alignment of the plunger as it traverses between a depressed position and a raised position relative to the plunger chamber opening.

5. The apparatus of claim 1, wherein the channels are uni-directional, with each channel facilitating the flow of fluid either from one of the plunger chambers to one of the float chambers or from one of the float chambers to one of the plunger chambers.

6. The apparatus of claim 5, wherein the housing further comprises a plurality of vertical channels, each of the vertical channels being positioned adjacent to one of the float chambers, and in fluid communication with one of the channels facilitating the flow of fluid from one of the plunger chambers to one of the float chambers, the vertical channels comprising a plurality of walls, with the vertical channel wall adjacent to the float chamber having a height less than the other walls of the vertical channel, and a height equal to or greater than an adjacent wall of the float chamber.

7. The apparatus of claim 1, wherein the valve assemblies comprise a movable partition, the partition being movable between a closed position wherein the partition constrains the flow of fluid from the float chamber to the plunger chamber, and an open position wherein the partition allows the flow of fluid from the float chamber to the plunger chamber, wherein the movable partition is rotatably affixed to an end of a lift bar, the opposing end of the lift bar being rotatably affixed to a post extending from the perimeter of the housing, such that as the lift bar rotates in one direction the partition is raised, and as the lift bar rotates in the opposing direction the partition is lowered; and wherein each bridge has a valve assembly post affixed to the bridge, the valve assembly post terminating in a hook, and wherein the lift bar comprises a tangential branch extending from a mid-portion of the lift bar to support a releasable coupling mechanism at the end of the tangential branch, wherein the releasable coupling mechanism of the tangential branch of the lift bar is positioned so that when the hook is at its lowest position, it secures to the releasable coupling mechanism and as the bridge raises, it lifts the end of the lift bar and thereby raises the partition, rotating the lift bar about the post, until the bridge reaches the upper position, at which point the releasable coupling mechanism based upon its design and configuration no longer engages with the hook, and is released, causing the partition to fall back in-between the float chamber and the plunger chamber, sealing the opening between the float chamber and the plunger chamber.

8. The apparatus of claim 1, wherein the float comprises a plurality of walls extending from a float base and sloped to a top ridge, and a plurality of stabilizer tubes affixed about the float base to stabilize the float within the float chamber.

9. The apparatus of claim 8, further comprising a plurality of I-shaped levers positioned to extend along a portion of the length of each bridge and receive contact by the float as it vertically traverses within the float chamber, the I-shaped levers being rotatably affixed at one end by means of an axle to the lower support structure and further comprising a roller secured at an opposing end of each lever, and engaged with the underside of each bridge.

10. The apparatus of claim 1, wherein each of the upper and lower support structures of the frame comprises a plurality of plates, the plates affixed by means of the frame, with a first set of plates extending in the first direction and positioned on one side of the float chambers, and a second set of plates extending in the first direction and positioned on the opposing side of the float chambers.

11. The apparatus of claim 10, wherein each lever is rotatably affixed to one of the plates of the upper support structure or the lower support structure by means of a lever axle, the lever axle extending between at least two corresponding plates on one side of the aligned float chambers.

12. The apparatus of claim 1, wherein the levers comprise lock levers and trigger levers, each of the lock levers being rotatably fixed to one end of one of the elongated transfer bar, and each of the trigger levers rotatably affixed to an opposing end of the elongated transfer bar.

13. The apparatus of claim 12, wherein the valve assemblies and the plungers are affixed to the bridge by couplings, each coupling comprising a lock pin aperture; and wherein each lock lever comprises a needle lock pin secured to a side of the lock lever, extending parallel with a surface of the lock lever, sized and configured to be received in the lock pin aperture of the coupling when the lock pin aperture and the needle lock pin are aligned.

14. The apparatus of claim 13, wherein the lock levers comprise upper lock levers and lower lock levers, each of the upper lock levers and lower lock levers being weighted and rotationally affixed to the upper support structure or lower support structure, respectively, in a manner so that when unimpeded by the bridge or the transfer bar, gravity causes the upper lock lever or the lower lock lever to rotate about an axle to a position so that the needle lock pin thereof is aligned with the lock pin aperture of the coupling of the valve assembly or the plunger.

15. The apparatus of claim 1, wherein one end of each of the lock levers comprises an angled tip to facilitate rotation of the lock lever as the bridge passes up or down past the angled tip of the lock lever.

16. The apparatus of claim 10, wherein the transfer bars are movably supported on a plurality of rollers, the rollers being rotatably affixed by axles to the plates on the corresponding side of the float chamber.

17. An apparatus for translating energy through the use of mechanics, fluid displacement, gravity and buoyancy, the apparatus comprising:
a base comprising a plurality of float chambers and a plurality of plunger chambers
wherein the float chambers and the plunger chambers are in fluid communication by means of a plurality of channels, and wherein each of the float chambers is in fluid communication with plunger chambers that are not aligned with the float chamber,
wherein the base further comprises a plurality of valve assemblies, each valve assembly being positioned within the base to control delivery of fluid from one of the float chambers to one of the plunger chambers, and
wherein each of the plunger chambers comprises a vacuous plunger chamber area and a plunger chamber opening, with a flexible gasket secured about the plunger chamber opening to maintain a watertight seal between the vacuous plunger chamber area and the plunger chamber opening;
a plurality of floats made of a buoyant material, sized and shaped to be received and traverse vertically within the float chambers;
a plurality of plungers sized and configured to be received within the plunger chamber openings of the plunger chambers; and
an energy transform assembly coupled with the base, comprising:
a frame supporting an upper support structure and a lower support structure,
a plurality of bridges, each bridge being movable between the upper support structure and the lower support structure,
wherein the bridges are respectively positioned to receive contact from one of the floats, as the float traverses upward in the float chamber, the upward traversion of the float thereby causing vertical upward movement of the bridge,
wherein each of the bridges comprises a toothed center rod designed and configured to couple with a directional bearing to translate vertical upward movement of the bridge to rotational movement of the bearing, and
wherein each of the plungers are coupled with the bridge by means of a plunger post, wherein the plunger post is positioned on the bridge so that the plungers are vertically aligned with the plunger chamber openings; and
a plurality of linkage mechanisms supported by the upper support structure and a plurality of linkage mechanisms supported by the lower support structure, wherein each linkage mechanism comprises a pair of levers and an elongated transfer bar, with each lever rotatably affixed to an opposing end of the transfer bar in a manner to translate rotation of one lever with lateral movement of the transfer bar and lateral movement of the transfer bar causes rotation of the other lever, and wherein each lever is aligned with one of the bridges so that when the bridge contacts the lever it forces the rotation of the lever.

18. The apparatus of claim 17, further comprising a plurality of I-shaped levers positioned to extend along a portion of the length of each bridge and receive contact by the float as it vertically traverses within the float chamber, the I-shaped levers being rotatably affixed at one end by means of an axle to the lower support structure and further comprising a roller secured at an opposing end of each lever, and engaged with the underside of each bridge.

19. The apparatus of claim 17, wherein each lever is rotatably affixed to the upper support structure or the lower support structure by means of a lever axle.

20. The apparatus of claim 17, wherein the valve assemblies and the plungers are affixed to the bridge by couplings, each coupling comprising a lock pin aperture; and wherein some of the levers comprise a needle lock pin sized and configured to be received in the lock pin aperture of the coupling when the lock pin aperture and the needle lock pin are aligned.

* * * * *